United States Patent [19]
Gartner

[11] 3,808,692
[45] May 7, 1974

[54] TAPE MEASURE COUNTER

[76] Inventor: Morton Gartner, 60 E. 8th St., New York, N.Y. 10003

[22] Filed: Jan. 3, 1972

[21] Appl. No.: 214,922

[52] U.S. Cl. .................. 33/138, 33/140, 33/143 R, 33/192, 235/98 R
[51] Int. Cl. ....... G06m 9/00, G01b 3/10, G01b 5/06
[58] Field of Search .......... 33/191, 192, 143 R, 140, 33/139, 138; 235/98 R

[56] References Cited
UNITED STATES PATENTS

| 2,770,046 | 11/1956 | Wichmann | 33/192 |
| 3,298,605 | 1/1967 | Bucke et al. | 235/98 R |
| 2,854,753 | 10/1958 | Caparros | 33/139 |
| 2,549,287 | 4/1951 | Brennan | 33/137 R |

Primary Examiner—Louis R. Prince
Assistant Examiner—Steven L. Stephan
Attorney, Agent, or Firm—Kenyon & Kenyon Reilly Carr & Chapin

[57] ABSTRACT

A device for counting identical items by measuring the thickness of a sample known quantity and relating such measurement to a larger unknown quantity under the same degree of pressure as the sample quantity.

16 Claims, 5 Drawing Figures

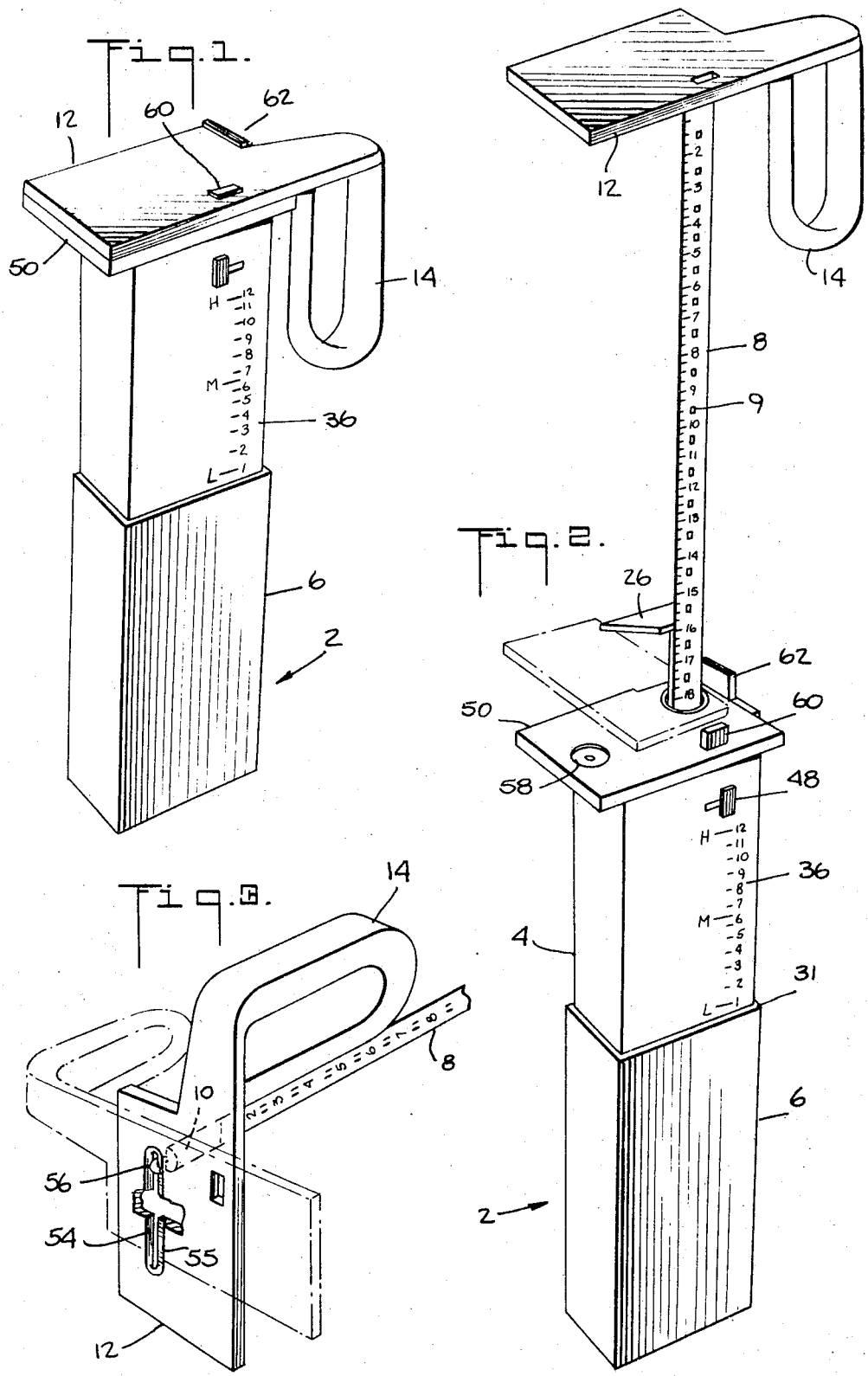

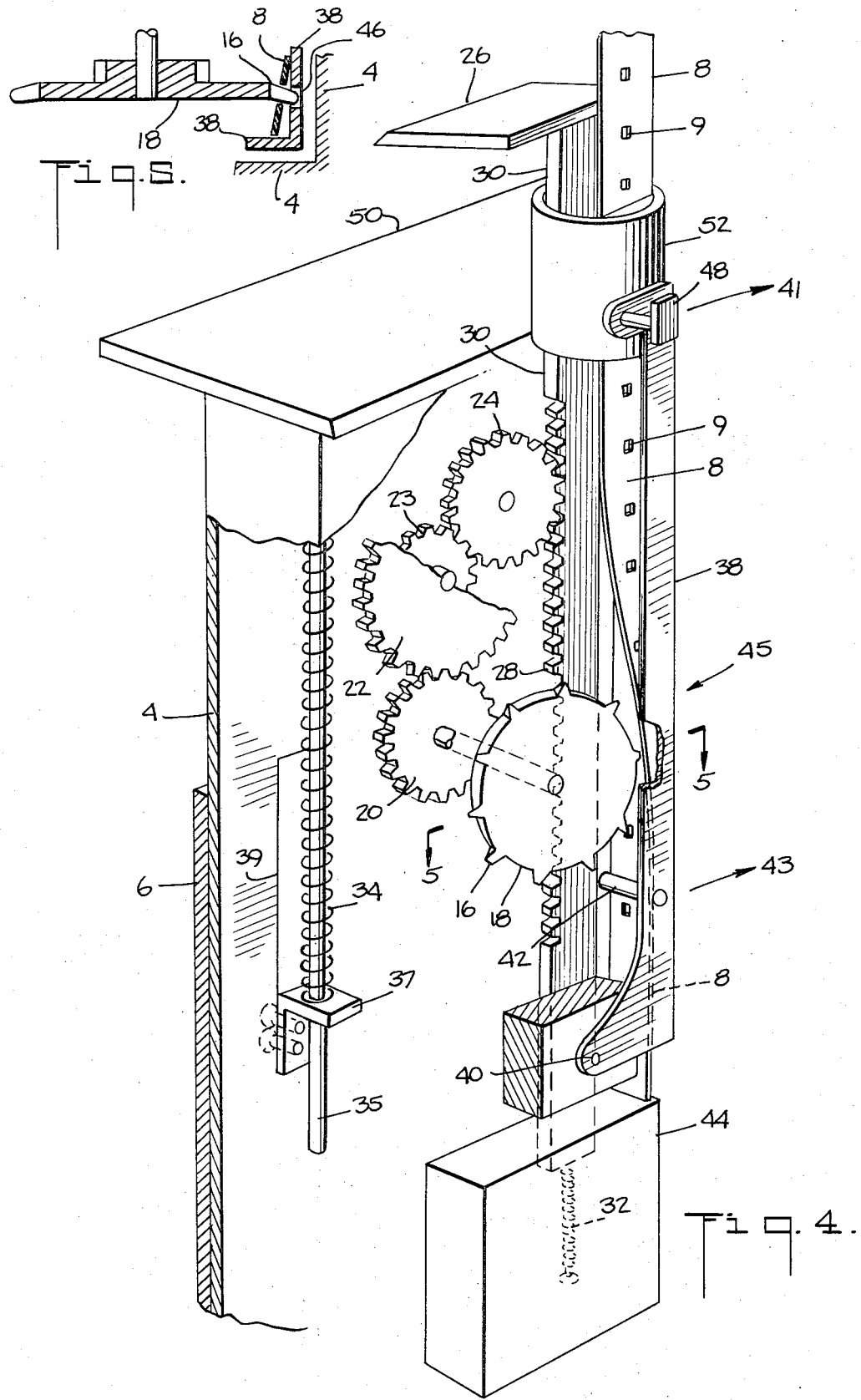

TAPE MEASURE COUNTER

SUMMARY OF THE INVENTION

This invention utilizes a measuring tape as a means for counting amounts of identically thick items by means of a relationship of linear measure to some degree of pressure. It enables one to determine the amount of like units in a comparatively large mass by relating a much smaller sample of known quantity to it. Contrariwise, by measurement against a known small quantity it enables one to construct a much larger one.

In the direct mail industry, there is an ever-present need for some means of quickly counting materials with a moderate degree of accuracy. Visual estimates are inaccurate, inefficient and frequently cause serious losses of time and waste of money.

Counting, other than being done manually, is performed mainly in two ways: either by running the items through a counting machine or by weighing them on a counting scale. Both these methods are obviously limited and not adequate for most of the requirements in the direct mail industry where it is necessary, even at a sacrifice of some degree of accuracy, to have an implement that will perform quickly, be extremely portable, and that can be applied to either large or small items.

This ability to quickly and correctly count materials would eliminate one very serious hindrance to smooth and efficient operation. The need exists in the entire gamut of operations: the Receiving Department needs some means to verify the amounts of goods received as listed on invoices; the Typing Department needs some means for counting lists received, for checking amounts of envelopes turned in by typists, etc.; likewise the Stock Room, Shipping Department, Printing and Mailroom are constantly hampered by incorrect "guesstimates" of materials required, whether it be supplies, enclosures, stock, or whatever.

The common practice, at present, when an amount needs to be quickly determined is to "Count 100 and stack." This means that a hand count of one hundred is made, laid on a flat surface, and the height of this is matched, and matched again, in increasing multiples as required. The main drawbacks of this practice are the time and handling necessary and the fact that it cannot be done with all types of materials.

This invention, a Tape Measure Counter, eliminates all these objections and in most cases does not even require removing materials from their containers. The invention is small enough to be carried on one's person, is quick and simple to use, and its accuracy is more than adequate for the various requirements of the industry.

While the utility and advantages of this device have been described in reference to the direct mail industry, the device has similar utility in many other fields.

The basic elements of the device are: a measuring tape, preferably of spring steel, marked off in consecutive small units; a second measure controlled by the measuring tape and related to it in a known ratio such as one to ten; a clutch for engaging and disengaging these two; and a means for exerting pressure with a scale for measuring the amount of this pressure.

By using various combinations of two or more of these features, there are various ways in which counts can be quickly made. A receiving clerk can tell by only two successive snaps of the measuring tape what one-hundredth part of a skid load would be and a hand count of this small sample would help him verify or contest an invoice. A stock man could fulfill a request for a quantity of brochures in various ways. If he knew from past experience the measurements of different amounts of the brochures under specific amounts of pressure, he could determine the related measurement and pressure combination to achieve his needs, or, he could hand count one-tenth (or one-hundredth) of the requirement, place a paper or other thin marker on that amount, and then extend the measuring tape until the blade of the second measure comes even with the small portion marker. (The process repeated would result in a hundredfold amount.) Or, since the measuring tape's numerals are sequential and the units small, he can utilize ratios other than ten to one that may be practical to reach the product amount.

DESCRIPTION OF THE DRAWINGS

FIG. 1 is an isometric view of the Tape Measure Counter, showing the measuring tape in its retracted position.

FIG. 2 is an isometric view of the Tape Measure Counter, showing the measuring tape in an extended position.

FIG. 3 is an isometric view of part of the Tape Measure Counter shown in FIG. 2.

FIG. 4 is an enlarged isometric view of part of the Tape Measure Counter shown in FIG. 2 and with a portion of the housing being cut away to reveal the interior components.

FIG. 5 is a cross-sectional view of FIG. 4 along the lines 5—5.

DETAILED DESCRIPTION

Referring to FIG. 1, the Tape Measure Counter (designated generally by the numeral 2) is partly contained within and partly on a hand-held housing 4 which has an outer pressure case 6.

Referring to FIG. 2, the measuring tape 8 contained within the housing 4 described herein is of the spring retraction type, but slightly narrower than those in general use. It is stiff, yet flexible and preferably made of a spring steel. It is perforated by holes equidistantly spaced along almost its entire length.

Referring to FIG. 3, the outside end of the measuring tape 8 is composed of a heavier, solid section 10 which, in turn, is connected to the measuring plate 12 which has a handle 14. As the measure plate 12 is extended or retracted, it extends or retracts the measuring tape 8 from housing 4. It is this measuring plate 12 which is extended to the extremity of a stack of items being counted (measured). The linear measurement obtained from the measuring tape is used to determine the count in the manner previously described.

Referring to FIG. 4, as the measuring tape 8, while in an engaged position, travels out or back, the holes 9 perforated equidistantly in a single line along the length the measuring tape 8 engage sprocket teeth 16 of tape gear 18 positioned within housing 4. The sprocket teeth 16 of the tape gear 18 are spaced equidistantly around the outer circumference of the tape gear 18. The distance between adjacent sprocket teeth 16 in tape gear 18 is equal to the distance between adjacent holes 9 perforated in measuring tape 8.

Referring to FIG. 5, the sprocket teeth 16 protrude from the tape gear 18 at a slight angle to accommodate the holes 9 of the measuring tape 8. The measuring tape 8 changes its plane approximately 45 degrees during the time it traverses the inside of the housing 4. The tape gear 18 has connected to it and common to its axis, a smaller pinion gear 20. The ratio between tape gear 18 and pinion gear 20 is ten to one or less. It is less in the embodiment illustrated herein, with the ratio of ten to one being achieved by the use of intermediary gears 22 and 23. Intermediary gear 22 meshes with pinion gear 20 and intermediary gear 23 meshes with tither gear 24. Other embodiments may be designed with a different gear ratio or may use fewer gears.

The tither spur gear 24 is affixed to the housing 4 and activates the tither blade 26 by meshing with a rack gear 28 positioned along tither bar 30. The foregoing assembly of gears (designated generally by the numeral 29) includes the tape gear 18, pinion gear 20, intermediary gears 22 and 23, tither gear 24 and rack gear 28, all of which are positioned within housing 4 and enable the movement of the measuring tape 8 to control the movement of tither bar 30. Thus, the tither bar 30 moves simultaneously with and in the same direction as the measuring tape 8 but only one-tenth the distance that the measuring tape 8 travels. The tither spring 32 is a relatively long spring anchored within a longitudinal bore starting at the rear of tither bar 30 and extending almost the entire length of tither bar 30. The tither spring 32 is attached to the back end of the housing 4 to exert pressure and retract the tither bar 30 and tither blade 26 to a starting position.

The tither blade 26 is a thin but sturdy appendage affixed at right angles to the front end of the tither bar 30. It is the sharpened edge of this blade that slices into the stacks being counted to indicate the one-tenth segment.

Referring to FIGS. 2 and 4, the measurement of pressure exerted is achieved by means of a sleeve-like pressure case 6 which engirds the back part of the housing 4 and slides on it. The pressure spring 34 within the housing 4 opposes the forward movement of pressure case 6. The pressure spring 34 is fitted around pressure rod 35 and both are anchored to the front end of the housing 4. As pressure case 6 is pushed forward, with base plate 50 positioned against the stack of compressible items to be counted, an increasing amount of force must be applied. The force applied is transmitted from pressure case 6 through link 37 affixed to the pressure case 6 through housing channel 39. Link 37 within housing 4 is slidably mounted on pressure rod 35 and transmits the force to pressure spring 34. As shown in FIG. 2, the leading edge 31 of pressure case 6 indicates the amount of pressure which can be read on pressure scale 36 etched into the outer surface of housing 4. This pressure measuring means is what enables to Tape Measure Counter 2 to be used for repetitive measurements of compressible items. For compressible items, the number of such items within a given stack may vary considerably depending upon the pressure being exerted on the stack at that time. When the linear measurement and pressure factor of a given quantity of an item are known, it is possible to repeat that count by measurement or to make related apportionments.

Referring to FIG. 4, the clutch bar 38 positioned within housing 4 engages and disengages the measuring tape 8 from the tither bar 30. When disengaged, the measuring tape 8 can move without moving the tither bar 30 or tither blade 26. The clutch bar 38 pivots at one end on pivot point 40 near the rear of the housing 4 and affixed to the housing 4. A clutch roller 42 projects from the side of the clutch bar 38 at a place between the spring-loaded retraction box 44 for the measuring tape 8 and the tape sprocket gear 18. The spring-loaded retraction box 44 is optional and is positioned within housing 4 and at the back end of housing 4.

Referring to FIGS. 4 and 5, a section of the clutch bar 38 is bent at right angles adjacent to the tape gear 18 and a channel 46 is cut into this right angle plane of the clutch bar 38 to align the holes 9 of the measuring tape 8 with the sprocket teeth 16 of the tape gear 18. The front end of the clutch bar 38 terminates with a control button or control bar 48 which projects through the housing 4. Only slight movement of this control button or bar 48 is needed to engage or disengage the measuring tape 8 from contact with the sprocket gear 18. Movement of control button or bar 48 in the direction of arrow 41 disengages the measuring tape 8. The clutch roller 42 is positioned immediately below the measuring tape 8 and it requires only a slight elevation of the clutch roller 42 (in the direction of arrow 43 in FIG. 4) to raise the measuring tape 8 clear of the sprocket teeth 16 of the tape gear 18 to disengage the measuring tape 8 from the tither bar 30 and enough depression of the clutch roller 42 and the right angle section of the clutch bar 38 (in the direction of arrow 43 in FIG. 4) to lower the measuring tape 8 so that its holes 9 drop over the sprocket teeth 16 of the tape gear 18 to engage the measuring tape 8 to the tither bar 30.

The base plate 50 is positioned at the front end of the housing 4. It is against this base plate 50 that the measurement to the measuring plate 12 and to the tither blade 26 is made. The base plate 50 is rotably connected to a sturdy base plate tube 52 which is mounted on the housing 4 and which communicates with the interior of housing 4. In the embodiment described herein, both the tither bar 30 and the measuring tape 8 pass through this tube 52 from the interior of the housing 4. In an alternate embodiment, the tither bar 30 could operate directly off a gear at the hub of the sprocket gear 18 and only the measuring tape 8 will pass through the tube 52. The tither bar 30 could travel out through the middle of the base plate 50. When the Counter is used on a table top, the base plate 50 is normally positioned with its longitudinal axis parallel to the longitudinal axis of the adjacent end of the housing 4. But when deeper measurements are required the base plate 50 can be rotated to a position at right angles to the adjacent end of the housing 4 and thereby acquire considerably greater extension. Rests 60 and 62 prevent the Counter 2 from slipping below the level along which the tither bar 30 is being extended.

Referring to FIG. 3, the outer end of the measuring tape 8 is connected to measuring plate 12 and handle 14 in such a manner as to allow it to slide freely within a grooved longitudinal channel 54 in the measuring plate 12. The measuring plate 12 can also rotate with respect to the measuring tape 8 by means of channel 54. This sliding and rotating capability is provided by means of hook 56 attached to the solid section 10 of measuring tape 8 which engages the groove 55 within channel 54. This enables the measuring plate 12 to be used in various positions and also permits it to be detached from the measuring tape entirely when desired. In an alternate embodiment (not shown in the drawings), a small rod could extend from the end of the measuring tape 8 and be rotably connected to the measuring plate 12 by a pin at right angles to the rod which pin would engage two grooves on either side of the interior of channel 54.

The Counter can be used to measure inside packed boxes or cartons, or to measure things extending beyond reach by removing the measuring plate 12 from the measuring tape 8. The measuring tape 8 without the measuring plate 12 is merely extended until the outer solid section 10 of the measuring tape 8 reaches the extremity of the material to be measured.

Optionally, the base plate 50 may be provided with a hole 58 to accommodate a thumb tack, screw or a bracket or other means for securing the Counter 2 for off-table use so that material can be stacked on top of the base plate 50 while the Counter is suspended from the edge of the table. Thus, the measuring tape 8 can be extended perpendicular to the plane of the table top.

In the foregoing specification, the invention has been described in reference to a specific exemplary embodiment. Variations and modifications, as well as the substitution of equivalent structures and arrangements, may be made without departing from the broader scope and spirit of the invention. The specification and drawings are accordingly to be regarded in an illustrative rather than a restrictive sense.

A typical method for using the Tape Measure Counter 2 is by extending the measuring tape 8 to the outer extremity of the unknown quantity of identical items to be counted. The measuring tape 8 is engaged to the tither bar 30 by means of the assembly of gears 29 so that when the measuring tape 8 is extended the tither bar 30 also moves. When the measuring tape 8 has reached the outer extremity of the unknown quantity of items, the thickness of a smaller sample quantity is measured by means of the tither bar 30 and tither blade 26. Then, this smaller sample quantity is counted, such as by hand. Knowing the number of items in the small sample quantity encompassed by the tither blade 26, the thickness of the larger quantity is then measured by means of the measuring tape 8. During this time when the measuring tape 8 and tither bar 30 are being used, the amount of pressure exerted on the items is also measured on pressure scale 36. Then, the number of items encompassed by the measuring tape 8 is computed by multiplying the number of items which have been counted in the smaller sample quantity by the gear ratio achieved by the assembly of gears 29 between the measuring tape 8 and the tither bar 30. In this embodiment, the gear ratio is ten to one. Therefore, the number of items in the sample quantity is multiplied by ten and this reveals the total number of items encompassed by the measuring tape 8.

If the number of items encompassed by the tither bar 30 and tither blade 26 is deemed too large to be counted by hand, then the foregoing method may be repeated. Thus, after the measuring tape 8 has been extended to the outer extremity of the unknown quantity and the thickness of the smaller sample quantity encompassed by the tither bar 30 and tither blade 26 has been determined, the measuring tape 8 may be retracted so that the measuring tape 8 only encompasses the thickness of the smaller sample quantity previously encompassed by the tither bar 30 and tither blade 26. The result is that the tither bar 30 and tither blade 26 are also retracted and encompass a much smaller sample quantity. In this embodiment having a gear ratio of ten to one, this second smaller sample quantity represents one-hundredth of the total number of items in the larger unknown quantity originally encompassed at the outset by the measuring tape 8.

Once the total number of items in a larger quantity encompassed by the measuring tape have been computed by multiplication of the gear ratio, another similar quantity may be constructed. The measuring tape 8 is again extended to its outer extremity to apply the same measurement and count of items previously achieved by the measuring tape. For compressible items, the same amount of pressure must be exerted on the new quantity of items as was measured for the previous quantity. The result is that the measuring tape 8 is able to achieve a count of the same number of items as previously. Then, this resulting number of items is merely added to the same number of items counted previously. These steps may be repeated until the total quantity of items has been counted.

What is claimed is:

1. A tape measure counter for counting amounts of similarly thick items by means of comparison of two linear measures and under a controllable degree of pressure, comprising:
  a. a flexible measuring tape having a tip and being coiled about a central region and enclosed by a housing having a front and a back end, said front end having an aperture therein and a face portion proximate to said aperture for applying pressure to said items when said housing is pressed against said items, said tape being extendable from said housing through said aperture in response to tension applied to said tape, said tape having holes perforated equidistantly along its length,
  b. a tither blade mounted on said housing and being movable in a direction parallel to the direction of extension of said tape, said tip of said tape being substantially smaller than said housing and said tither blade,
  c. an assembly of gears connected between said tape and said tither blade and in engagement with the holes in said tape for moving the tither blade in response to extension of said tape in an amount which is a predetermined fraction of the movement of said measuring tape, and
  d. means for measuring the amount of pressure under which said face portion is pressed against said items.

2. The apparatus of claim 1, further comprising: clutch means connected to said gears for selectively disconnecting said gears from said tither blade for enabling extension of said tape without movement of said tither blade.

3. A tape measure counter according to claim 1 wherein the assembly of gears comprises:
  a. a tape gear positioned within the housing and having sprocket teeth which engage the holes perforated in the measuring tape;
  b. a pinion gear positioned within the housing, connected to the tape gear and rotating on a common axis with the tape gear;

c. two intermediary gears on a common axis, positioned within the housing, one of which gears meshes with the pinion gear;
d. a tither spur gear positioned within the housing which meshes with the intermediary gear that does not mesh with the pinion gear; and
e. a rack gear positioned within the housing along the tither bar and which meshes with the tither gear.

4. A tape measure counter according to claim 3 wherein the sprocket teeth of the tape gear are positioned at a slight angle from the sprocket gear.

5. A tape measure counter according to claim 1 wherein the ratio of movement of the measuring tape to the movement of the tither bar established by the assembly of gears is ten to one.

6. A tape measure counter according to claim 1 wherein the measuring tape:
a. is made of a spring steel;
b. is marked off in units along its length;
c. has a heavier, solid section located at its outer end;
d. has a hook attached to the solid section of the measuring tape; and
e. has a measuring plate connected by means of the hook to the solid section of the measuring tape.

7. A tape measure counter according to claim 6 wherein the measuring plate comprises:
a. a handle projecting from the measuring plate;
b. a longitudinal channel in the measuring plate; and
c. a groove within the channel in which the hook of the measuring tape can slide freely and can rotate and from which the hook can be removed to detach the measuring plate from the measuring tape.

8. A tape measure counter according to claim 1 wherein the measuring tape:
a. has a spring-loaded retraction box positioned within the housing and at the back end of the housing; and
b. changes its plane approximately 90° during the time it traverses the inside of the housing.

9. A method for counting identical compressible items comprising the steps of:
a. extending the measuring tape to the outer extremity of an unknown quantity of said items to be counted with the measuring tape engaged to the tither bar;
b. measuring the thickness of a small sample quantity of said items by means of the tither bar and tither blade;
c. counting the number of items in the sample quantity;
d. measuring the thickness of the larger unknown quantity by means of the measuring tape;
e. measuring the amount of pressure on the items while the measuring tape and tither bar are being used; and
f. computing the number of items in the unknown quantity encompassed by the measuring tape by multiplying the number of items in the sample quantity by the gear ratio between the measuring tape and the tither bar.

10. A method according to claim 9 comprising the additional steps of:
a. applying the same measurement and count of items achieved by the measuring tape in claim 9 to another quantity of the same items;
b. maintaining the same pressure on the items being counted;
c. adding the resulting number of items counted to the same number of items counted in claim 11; and
d. repeating steps (a), (b) and (c) until the total quantity of items has been counted.

11. Apparatus for counting stacks of objects having similar thickness by determining a linear displacement of a portion of said stack which is a predetermined fraction of the linear displacement of a larger quantity of said objects under a selectively controllable degree of pressure, said apparatus comprising:
a. an elongated housing having an aperture and a face portion adjacent said aperture,
b. a flexible measuring tape having a tip and being extensibly coiled within said housing and being extendable therefrom through said aperture in response to tension applied thereto and being spring biased to coil within said housing so as to be compactly positionable within said housing when not so extended,
c. a divider blade movably mounted outside said housing, means mounting said blade for movement in a direction parallel to motion of said tape during extension thereof from said housing, said tip of said tape being considerably smaller than either of said divider blade and said face portion of said housing,
d. drive means connected between said tape and said divider blade to move said divider blade in response to extension of said tape, the amount of motion of said divider blade being a predetermined fraction of the amount of extension of said tape, and
e. pressure measuring means connected to said housing for measuring the degree of pressure exerted on said face portion of said housing when said face portion is pressed against said objects to be counted, said pressure measuring means enabling control of the pressure under which the count is made.

12. The apparatus of claim 11, further comprising: clutch means connected to said drive means for selectively disconnecting said drive means from said divider bar for enabling extension of said tape without movement of said divider bar.

13. The apparatus of claim 11, wherein: said face portion comprises a flat plate pivotally mounted on said housing adjacent said aperture for enabling actuation of said pressure measuring means on stacks of objects to be counted which stacks are positioned outside the region of the longitudinal axis of said housing.

14. A tape measure counter for counting amounts of similarly thick items by means of comparison of two linear measures and under a controllable degree of pressure, comprising:
a. a flexible measuring tape having a tip and being coiled about a central region and enclosed by a housing having a front and a back end, said front end having an aperture therein, and a face portion proximate to said aperture for applying pressure to said items when said housing is pressed against said items, said tape being extendable from said housing through said aperture in response to tension applied to said tape, said tape having holes perforated equidistantly along its length, b. a tither blade mounted on said housing and being movable in a direction parallel to the direction of extension of said tape, said tip of said tape being substantially smaller than said housing and said tither blade,
c. an assembly of gears connected between said tape and said tither blade and in engagement with the holes in said tape for moving the tither blade in response to extension of said tape in an amount which is a predetermined fraction of the movement of said measuring tape, and
d. means for measuring the amount of pressure under which said face portion is pressed against said items said pressure measuring means comprising:
  i. a pressure scale on the outer surface of said housing,
  ii. a sleeve-like pressure case which engirds the back end of the housing and slides upon the housing, the leading edge of which pressure case indicates the pressure on the pressure scale,
  iii. a pressure spring mounted within the housing and anchored to the front end of the housing, which pressure spring opposes the forward movement of the pressure case,
  iv. a pressure rod around which the pressure spring is fitted, the pressure rod being anchored to the front end of the housing, and
  v. a link affixed to the pressure case and slideably mounted on the pressure rod to transmit the force applied from the pressure case to the pressure spring.

15. A tape measure counter for counting amounts of uniformily thick items by means of a relationship of linear measure and pressure, comprising:
a. a flexible measuring tape having a tip and being coiled about a central region and enclosed by a housing having a front end and a back end, said front end having an aperture therein and a face portion proximate to said aperture for applying pressure to said items when said housing is pressed against said items, said tape being extendable through said aperture in said housing in response to tension applied to said tape, said tape having holes perforated equidistantly along its length,
b. a tither blade mounted on said housing and being movable in a direction parallel to the direction of extension of said tape through said aperture,
c. an assembly of gears connected between said tape and said tither blade and in engagement with said holes in said tape for moving the tither blade in response to movement of said tape in an amount which is a predetermined fraction of the movement of said measuring tape,
d. means for measuring the amount of pressure under which said face portion is pressed against said items;
e. a clutch bar positioned within the housing for engaging and disengaging the measuring tape from the tither blade, which clutch bar comprises:
  i. a pivot point at one end of the clutch bar near the rear of the housing,
  ii. a clutch roller projecting from the clutch bar to raise the measuring tape clear of the sprocket teeth of the tape gear and thereby disengage the measuring tape from the tither bar,
  iii. a section of the clutch bar bent at right angles adjacent to the tape gear to lower the measuring tape and engage the tither bar,
  iv. a channel cut into the right angle section of the clutch bar to align the holes of the measuring tape in which the sprocket teeth of the tape gear; and
  v. a control bar on the front end of the clutch bar which projects through the housing.

16. A tape measure counter for counting amounts of similarly thick items by means of comparison of two linear measures and under a controllable degree of pressure, said counter comprising:
a. a flexible measuring tape having a tip and being coiled about a central region and enclosed by a housing having a front and a back end, said front end having an aperture therein, and a face portion proximate to said aperture for applying pressure to said items when said housing is pressed against said items, said tape being extendable from said housing through said aperture in response to tension applied to said tape, said tape having holes perforated equidistantly along its length,
b. a tither blade mounted on said housing and being movable in a direction parallel to the direction of extension of said tape, said tip of said tape being substantially smaller than said housing and said tither blade,
c. an assembly of gears connected between said tape and said tither blade and in engagement with the holes in said tape for moving the tither blade in response to extension of said tape in an amount which is a predetermined fraction of the movement of said measuring tape,
d. means for measuring the amount of pressure under which said face portion is pressed against said items,
e. a tither bar affixed at a right angle to the tither blade,
f. a tither spring anchored between the back end of said housing and a point proximate the front of the tither bar;
g. a base plate tube which is mounted on the housing and which communicates with the interior of the housing, through which tube the tither bar and the measuring tape pass from the interior of the housing; and
h. a base plate which is rotatably connected to the base plate tube and which base plate is positioned against the stack of items to be counted.

* * * * *